Patented Nov. 13, 1951

2,574,782

UNITED STATES PATENT OFFICE 2,574,782

CUPRIFEROUS AZO-DYESTUFFS OF THE STILBENE SERIES

Raymond Gunst, Basel, Switzerland, assignor to Ciba Limited, Basel, Switzerland

No Drawing. Application March 23, 1950, Serial No. 151,555. In Switzerland April 28, 1949

2 Claims. (Cl. 260—143)

According to this invention valuable new cupriferous azo dyestuffs of the stilbene series are made by treating a dyestuff of the general formula (1)
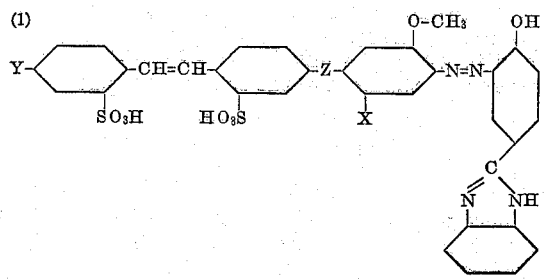

in which X represents a hydrogen atom or an —O—CH₃ group, Z represents a nitrogen-containing bridge such as an azoxy or azo group, and Y represents a nitro group or the radical $R_1$—N=N—$R_2$—Z— in which $R_1$ represents the radical of a diazo component, $R_2$ represents an aromatic radical of the benzene series containing the groups —N=N— and Z in para-position relatively to one another and Z represents a nitrogen-containing bridge such as an azoxy or azo group with an agent yielding copper until any methoxy group present in an ortho-hydroxy-ortho'-methoxy-azo grouping has been split up.

The azo dyestuffs of the above formula used as starting materials in the process may be prepared by condensing one mol of 4:4'-dinitrostilbene-2:2'-disulfonic acid with one mol of the aminoazo dyestuff of the formula (2)
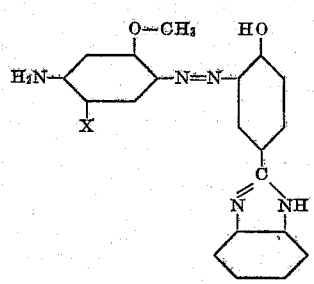

and, when necessary, also with an aminoazo dyestuff of the general formula (3) 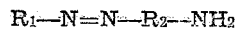 $R_1$—N=N—$R_2$—NH₂ in which $R_1$ represents the radical of a diazo component and $R_2$ represents an aromatic radical of the benzene series containing the groups —N=N— and —NH₂ in para-position relatively to one another.

As aminoazo dyestuffs of the general Formula 3 there may be used, among others, the aminoazo dyestuff of the Formula 2, in which case a product corresponding to the formula (4)
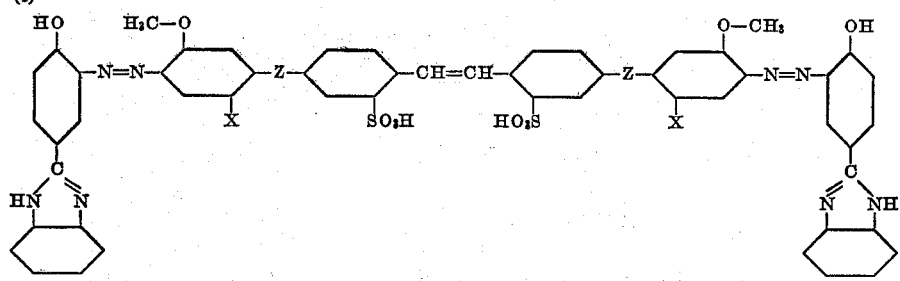

is produced, X and Z having the previously-recited significances; but other aminoazo dyestuffs are also suitable for this purpose.

When the 4:4'-dinitrostilbene-2:2'-disulfonic acid is condensed on one side only with the aminoazo dyestuff of the Formula 2, the condensation of the second nitro group with an aminoazo dyestuff of the Formula 3, which, if desired, may also be the compound of the Formula 2 may be complete or incomplete, that is to say, less than one mol, for example about ⅔ of a mol, of the aminoazo dyestuff of the Formula 3 may be used.

The aminoazo dyestuff of the Formula 2 may be prepared by coupling diazotized 2-(3'-amino-4'-hydroxyphenyl)-benzimidazole in an acid medium, for example, an acetic acid medium, with 1-amino-3-methoxy-benzene or 1-amino-2:5 - dimethoxybenzene. 2 - (3' - amino - 4'-hydroxyphenyl)-benzimidazole may be obtained by condensing 3-nitro-4-hydroxy-1-benzoic acid chloride with 1:2-diamino-benzene, and reducing to an amino group the nitro group in the 2-(3'-nitro-4'-hydroxyphenyl)-benzimidazole so obtained.

The condensations of 4:4'-dinitrostilbene-2:2'-disulfonic acid with the amino-monoazo dyestuffs of the Formulae 2 and 3 are advantageously conducted in an aqueous medium and in the presence of an alkali hydroxide. Good results are obtained, for example, by reacting the substances together in a dilute solution of alkali hydroxide, for example, of 2-8 per cent. strength, for a prolonged period, for example, 5-20 hours at a raised temperature, for example, in an open vessel at the boiling temperature of the reaction mixture and under reflux or at a higher temperature under pressure. When 4:4'-dinitrostilbene-2:2'-disulfonic acid is to be condensed not only with the aminoazo dyestuff of the Formula 2 but also with another aminoazo dyestuff of the Formula 3, it has generally been found advantageous to carry out both condensations in a single operation.

It can be seen from the above that the symbol Z herein denotes a nitrogen-containing bridge such as the different bridges formed by the reaction of the nitro group in 4-position to the —CH=CH— group of the stilbene compound with the primary amino group of the aminoazo dyestuff, i. e. more particularly an azo or azoxy group. When the molecule contains two groups Z they may be both azo or both azoxy groups or an azo group and also an azoxy group. It is also possible that mixtures of different compounds of this kind are formed.

The dyestuffs of the general Formula 1 are treated with an agent yielding copper until the methoxy group or groups present in the ortho-hydroxy-ortho'-methoxy-azo grouping or groupings have been split up completely with the formation of the complex copper compound.

As agents yielding copper there may be used in the present process, for example, salts of mono- or divalent copper such as cuprous chloride or cupric sulfate, and also compounds which contain copper in complex union. For this purpose cuprammine complexes are especially suitable, for example, the complex copper compounds obtainable from ammonia, alkyl amines such as ethylamine, morpholine, pyridine or piperidine. In order to ensure that the methoxy group or groups are completely split up with the formation of the copper complex in the stilbene-azo-dyestuffs used as starting materials in the present invention, it is generally necessary to conduct the treatment with the agent yielding copper at a raised temperature, for example, at about 90° C., and for a period of several hours. It is of advantage to work in an aqueous medium. If desired the treatment with the agent yielding copper may be conducted in the presence of a suitable addition. As such additions there may be mentioned, bases such as ammonia or organic bases, and, when a cuprammine complex is used, advantageously an excess of the same base as is present in the molecule of the cuprammine complex used. Other acid-binding agents may also be used. In general very good results are obtained by carrying out the treatment with an agent yielding copper by the process of U. S. patent application Ser. No. 778,734 (now U. S. Pat. No. 2,536,957), for example in the presence of an ethanolamine. The cupriferous azo dyestuffs of the stilbene series obtainable by the present invention are new and correspond to the general formula

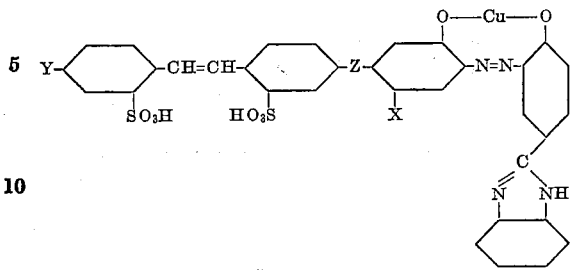

in which X represents a hydrogen atom or an —O—CH$_3$ group, Z represents a nitrogen-containing bridge such as an azoxy or azo group, and Y represents a nitro group or the radical R$_1$—N=N—R$_2$—Z—, in which R$_1$ represents the radical of a diazo component, R$_2$ represents an aromatic radical of the benzene series containing the groups —N=N— and Z in para-position relatively to one another, and Z represents a nitrogen-containing bridge such as an azoxy or azo group, and in which the linkage R$_1$—N=N—R$_2$ may be present in the form of the complex linkage

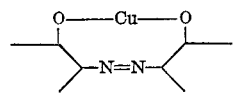

Where the azo dyestuff corresponds to Formula 4 and X stands for hydrogen, the cupriferous dyestuff will correspond to the formula

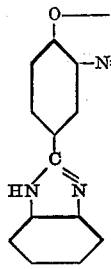 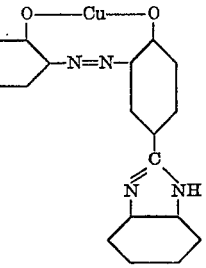

The cupriferous azo dyestuffs obtainable by the present invention are suitable for dyeing or printing a very wide variety of materials, for example, materials of animal origin such as wool or leather. Owing to their good affinity for vegetable fibers they are especially suitable for dyeing or printing cellulosic materials, such as linen, cotton, or artificial silk or staple fibers of regenerated cellulose.

The yellow-brown to brown-violet to olive dyeings obtainable on cellulose fibers with the new cupriferous azo dyestuffs are distinguished, above all, by their good fastness to washing and excellent fastness to light.

The following examples illustrate the invention, the parts being by weight unless otherwise stated and the relationship of parts by weight to parts by volume being the same as that of the kilogram to the liter:

*Example 1*

21.1 parts of 2-(3'-amino-4'-hydroxyphenyl)-benzimidazole are dissolved in 150 parts of water with the addition of 30 parts of hydrochloric acid of 30 per cent. strength, and diazotized by the addition of a solution of 6.9 parts of sodium nitrite in 50 parts of water at 0° C., and the finished diazo compound is separated by filtration. For coupling, 12.3 parts of 1-amino-3-methoxybenzene are dissolved in 100 parts of acetic acid of 90 per cent strength and the solution is coupled with the diazo compound which is stirred with a small quantity of water and ice. After stirring for several hours the reaction mixture is heated to 50° C., and the dyestuff formed is precipitated completely, if necessary by the addition of sodium chloride, and separated by filtration.

The resulting monoazo dyestuff is introduced into a stirring vessel provided with a reflux condenser and containing 1000 parts of water, and is neutralized with sodium hydroxide solution at the same time. 24 parts of the disodium salt of 4:4'-dinitrostilbene-2:2'-disulfonic acid and 100 parts of a sodium hydroxide solution of 30 per cent. strength are then added and the reaction mixture is maintained at the boil for 24 hours while stirring and refluxing.

By adding sodium chloride and neutralizing a part of the excess of alkali with hydrochloric acid the condensation product formed can be separated from the reaction mixture.

In order to convert it into the complex copper compound the condensation product separated by filtration is suspended in 15 times its weight of water, 40 parts of ammonia solution of 25 per cent. strength and 40 parts of monoethanolamine are added and the whole is well stirred for 30 minutes at 90° C. The homogeneous mixture is introduced into a stirring vessel provided with a reflux condenser, 50 parts of a 2N-solution of copper sulfate and 50 parts of an ammonia solution of 25 per cent. strength are added, and the whole is maintained at 90–95° C. for 12 hours while stirring. The complex copper compound may be precipitated by salting out and separated by filtration. It is a dark powder which dissolves in water with a violet coloration and dyes cotton violet brown tints which are fast to washing and light.

The 2-(3'-amino-4'-hydroxyphenyl)-benzimidazole may be prepared as follows:

54 parts of 1:2-diaminobenzene are dissolved in 500 parts by volume of chlorobenzene with the addition of 120 parts by volume of pyridine. At 60° C. there are added in portions, while stirring, 101 parts of 3-nitro-4-hydroxy-1-benzoic acid chloride. The mixture is then heated to the boil and maintained for 2 hours at the boiling temperature. The chlorobenzene and pyridine are then distilled off with steam. By acidifying the residue of the distillation the resulting 2-(3'-nitro-4'-hydroxyphenyl)-benzimidazole is precipitated in a well filterable form. The nitro group in the product so obtained is reduced to an amino group, for example, by catalytic reduction by means of a nickel catalyst in an aqueous alcoholic suspension.

*Example 2*

34.5 parts of the monoazo dyestuff obtained as described in the first paragraph of Example 1 and 39.0 parts of the monoazo dyestuff from diazotized 2-aminonaphthalene-4:8-disulfonic acid and 1-amino-2:5-dimethylbenzene are condensed with 47.5 parts of the disodium salt of 4:4'-dinitrostilbene-2:2'-disulfonic acid in 1800 parts of water with the addition of 160 parts of sodium hydroxide solution of 30 per cent. strength by maintaining the reaction mixture at the boil under reflux for 18 hours while stirring.

By adding sodium chloride and neutralizing a part of the excess of alkali with hydrochloric acid the condensation product formed is precipitated, and is then separated by filtration.

In order to convert the condensation product into its complex copper compound it is dissolved in 12 times its weight of water at 90° C. with the addition of a small amount of ammonia. To the solution is added a mixture of 50 parts of a 2N-solution of copper sulfate and 50 parts of an ammonia solution of 25 per cent. strength, and the whole is maintained at 90–95° C. for 5 hours while stirring.

The complex copper compound, which is precipitated from solution by means of sodium chloride and dried, is a dark brown powder which dissolves in water with a brown coloration and dyes cotton beautiful brown tints which are fast to washing and light.

By replacing the 39.0 parts of the monoazo dyestuff from diazotized 2-aminonaphthalene-4:8-disulfonic acid and 1-amino-2:5-dimethylbenzene by the corresponding quantities of the monoazo dyestuffs prepared from diazotized 2-aminonaphthalene-4:8-disulfonic acid and 1-amino-3-methylbenzene or 1-amino-2-methoxybenzene, and otherwise proceeding in the manner described in this example, there are obtained cupriferous dyestuffs which dye cotton somewhat more yellowish or distinctly more reddish-brown tints, respectively.

*Example 3*

A dyebath is prepared which contains in 3000 parts of water 2 parts of the dyestuff obtained as described in Example 1 and 30 parts of crystalline sodium sulfate. 100 parts of cotton are entered into the dyebath at 50° C., the temperature is increased to 95° C., and dyeing is carried on at this temperature for one hour. The cotton is then rinsed and dried. It is dyed a brown violet tint, and the dyeing is distinguished by good fastness to washing and light.

Having thus disclosed the invention, what I claim is:

1. A cupriferous azo dyestuff of the stilbene series corresponding to the formula

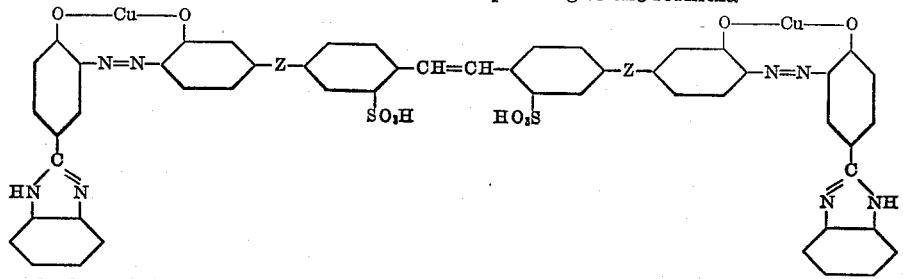

in which Z represents a member of the group consisting of azo and azoxy groups.

2. The cupriferous azo dyestuff corresponding to the formula set forth in claim 1, wherein each Z represents an azoxy group.

RAYMOND GUNST.

No references cited.